United States Patent
Wright et al.

(10) Patent No.: US 7,631,024 B2
(45) Date of Patent: Dec. 8, 2009

(54) METHOD AND APPARATUS FOR FACILITATING MARK-SWEEP GARBAGE COLLECTION WITH REFERENCE COUNTING

(75) Inventors: Gregory M. Wright, Mountain View, CA (US); Mario I. Wolczko, San Carlos, CA (US); Matthew L. Seidl, Austin, TX (US)

(73) Assignee: Sun Microsystems, Inc., Santa Clara, CA (US)

(*) Notice: Subject to any disclaimer, the term of this patent is extended or adjusted under 35 U.S.C. 154(b) by 373 days.

(21) Appl. No.: 11/325,381

(22) Filed: Jan. 3, 2006

(65) Prior Publication Data

US 2007/0162527 A1    Jul. 12, 2007

(51) Int. Cl.
*G06F 12/00* (2006.01)
*G06F 17/30* (2006.01)
*G06F 15/16* (2006.01)

(52) U.S. Cl. .................... 707/206; 707/205
(58) Field of Classification Search ......... 707/205–206; 711/133–136; 717/140
See application file for complete search history.

(56) References Cited

U.S. PATENT DOCUMENTS

| 6,339,779 B1* | 1/2002 | Houldsworth ........... 707/206 |
| 6,839,726 B2* | 1/2005 | Kawamoto .............. 707/206 |
| 7,216,136 B2* | 5/2007 | Bacon et al. ............ 707/206 |
| 2003/0069905 A1* | 4/2003 | Dussud ................. 707/206 |

* cited by examiner

*Primary Examiner*—Tony Mahmoudi
*Assistant Examiner*—Cecile Vo
(74) *Attorney, Agent, or Firm*—Park, Vaughan & Fleming LLP (57) ABSTRACT

A method and a system for facilitating garbage collection (GC) operations in a memory-management system that supports both mark-sweep (MS) objects and reference-counted (RC) objects, wherein objects which are frequently modified are classified as MS objects, and objects which are infrequently modified are classified as RC objects. During a marking phase of a GC operation, the system identifies a set of root objects and then marks referents of the root objects. The system then recursively traverses referents of the root objects which are MS objects and while doing so, marks referents of the traversed MS objects. However, if an RC object is encountered during the traversal of an MS object, the system marks the RC object but does not recursively traverse the RC object. In doing so, the system avoids traversing a large number of RC objects which are infrequently modified.

18 Claims, 4 Drawing Sheets

METHOD AND APPARATUS FOR FACILITATING MARK-SWEEP GARBAGE COLLECTION WITH REFERENCE COUNTING

BACKGROUND

1. Field of the Invention

The present invention relates to computer systems. More specifically, the present invention relates to a method and an apparatus for facilitating mark-sweep garbage collection with reference counting in a memory-management system.

2. Related Art

Computer users are demanding the ability to scale computer applications so that they can use very large heaps while maintaining a high level of performance. During computer system operation, an object within a heap becomes unreachable when it is no longer reachable from any process or thread. The unreachable object is then considered to be "garbage". As time passes, a buildup of these garbage objects can slowly exhaust the memory space. The process of finding all the garbage objects and reclaiming the memory space that they occupy is referred to as "garbage collection". Unfortunately, garbage collection of very large heaps can be a very time-consuming and costly process. As a result, system users are demanding lower garbage collection overhead and lower pause times for memory-management systems that perform garbage collection operations.

Commonly used garbage collection schemes are typically based on the mark-sweep technique. Mark-sweep garbage collection involves traversing and marking all reachable "live" objects in the heap, and then reclaiming (or "sweeping") the unmarked garbage objects. Unfortunately, this technique may be inefficient in dealing with portions of the heap that are not frequently modified, such as a large read-mostly database. During each garbage collection cycle, all of the live objects are remarked even if that portion of the heap was not modified.

Alternatively, reference-counting garbage collection involves maintaining a reference count in each object of the number of other references in the heap which refer to the object. The reference count of an object is only updated when a reference is added to or removed from a referring object. When a reference count reaches zero, the object may be reclaimed. However, reference counting may be inefficient because, whenever a reference in the heap is modified, the reference counts on the old and new referents must be adjusted. This additional overhead may be prohibitively expensive when the contents of the heap are rapidly changing.

Hence, what is needed is a garbage collection system with the efficiency of mark-sweep garbage collection for portions of the heap which are frequently modified, and the efficiency of reference-counting garbage collection for portions of the heap which are not frequently modified.

SUMMARY

One embodiment of the present invention provides a system that facilitates garbage collection (GC) in a memory-management system that supports both mark-sweep (MS) objects and reference-counted (RC) objects, wherein both MS objects and RC objects can be marked and have a reference count. During a marking phase of a GC operation, the system first identifies roots for the GC operation. Next, the system marks referents of the roots. The system then recursively traverses referents of the roots which are MS objects and while doing so, marks referents of the traversed MS objects. During a subsequent sweeping phase of the GC operation, the system reclaims objects that are unmarked and have a zero reference count.

In a variation on this embodiment, both the MS objects and the RC objects contain the following fields: (1) an indicator bit indicating whether an object is an MS object or an RC object; (2) a mark bit indicating whether the object is marked or unmarked; and (3) a reference counter, which maintains a reference count for the object.

In a variation on this embodiment, objects which are frequently modified are classified as MS objects, and objects which are infrequently modified are classified as RC objects.

In a variation on this embodiment, identifying roots for the GC operation involves identifying MS objects with non-zero reference counts.

In a variation on this embodiment, during recursively traversing referents of the roots, if a referent is identified as an RC object, the referent is marked but is not recursively traversed.

In a further variation, an RC object, which contains a reference to a referent, which is either an MS object or an RC object, contributes one to the referent's reference count. On the other hand, an MS object which contains a reference to a referent, which is either an MS object or an RC object, does not contribute to the referent's reference count.

In a variation on this embodiment, the system receives a command to modify a reference within an object to point to a new referent. In response to this command, the system determines if the object is an RC object. If so, the system decrements the reference count in a previous referent for the reference and increments the reference count in the new referent for the reference.

In a further variation, converting an object from an MS object to an RC object involves changing the indicator bit of the object to indicate that the object is an RC object and incrementing reference counts for all referents of the object.

In a further variation, converting an object from an RC object to an MS object involves changing the indicator bit of the object to indicate that the object is an MS object and decrementing reference counts for all referents of the object.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer System

Figure 1:
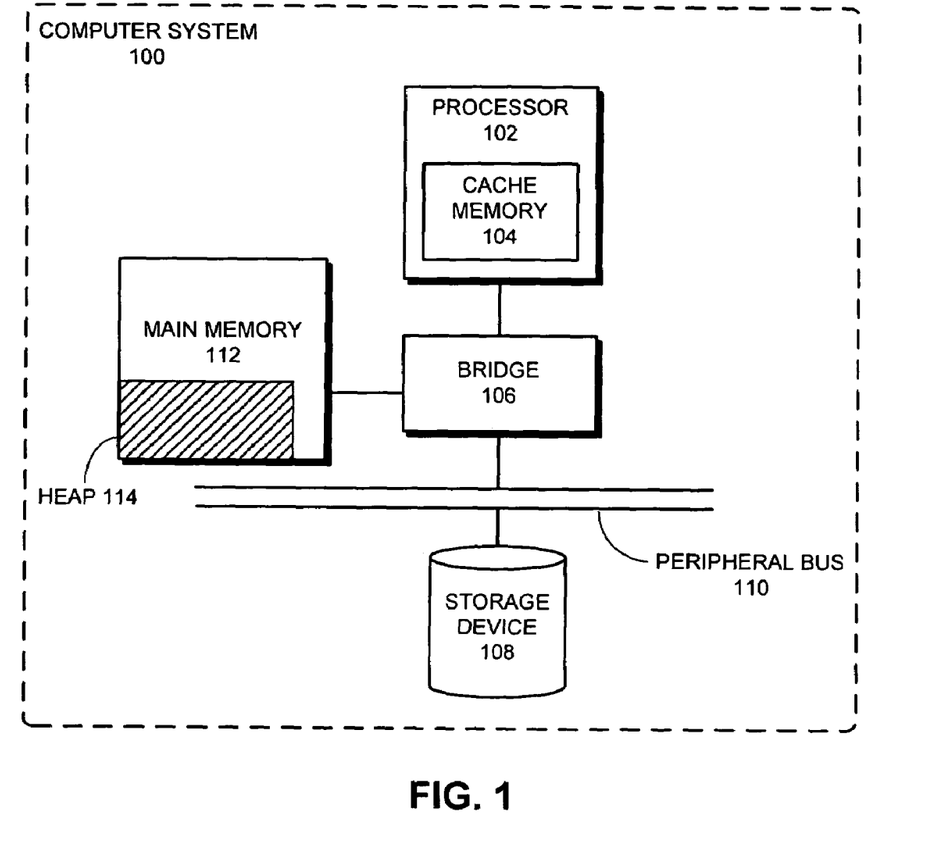
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a main memory 112 and to peripheral bus 110 through bridge 106. Bridge 106 can generally include any type of circuitry for coupling components of computer system 100 together. It should be recognized that one or more components of the computer system 100 may be located remotely and accessed via a network.

Processor 102 can include any type of processor, including, but not limited to, a microprocessor, a mainframe computer, a digital signal processor, a personal organizer, a device controller and a computational engine within an appliance. Processor 102 includes cache memory 104, which can be accessed more quickly than main memory 112 or storage device 108.

Processor 102 communicates with main memory 112 through bridge 106. Main memory 112 can include any type of memory that can store code and data for execution by processor 102. Heap 114 is a region of main memory 112 in which objects can be allocated dynamically.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Note that although the present invention is described in the context of computer system 100 illustrated in FIG. 1, the present invention can generally operate on any type of computing device that supports garbage collection. Hence, the present invention is not limited to the computer system 100 illustrated in FIG. 1.

Combining MS Objects and RC Objects

In one embodiment of the present invention, an object in heap 114 is designated as either a mark-sweep (MS) object or a reference-counted (RC) object for the purpose of garbage collection. Objects which are frequently modified are classified as MS objects, and objects which are infrequently modified are classified as RC objects. During execution of an application, both MS objects and RC objects may be modified.

In one embodiment of the present invention, each object in heap 114 contains the following fields to support garbage collection: (1) an indicator bit which indicates whether an object is an MS object or an RC object; (2) a mark bit which indicates whether the object is marked or unmarked; and (3) a reference counter which maintains a reference count for the object. Note that an object which includes the above structures can provide the properties of both a regular MS object and a regular RC object.

In one embodiment of the present invention, the following conventions are used to determine the reference count of an object. An RC object, which contains a reference to a referent, contributes one to the referent's reference count, regardless of whether the referent is an MS object or an RC object. On the other hand, an MS object, which contains a reference to a referent, does not contribute to the referent's reference count, regardless of whether the referent is an MS object or an RC object. This is explained in more detail in the following paragraphs associated with FIG. 4.

Figure 2:
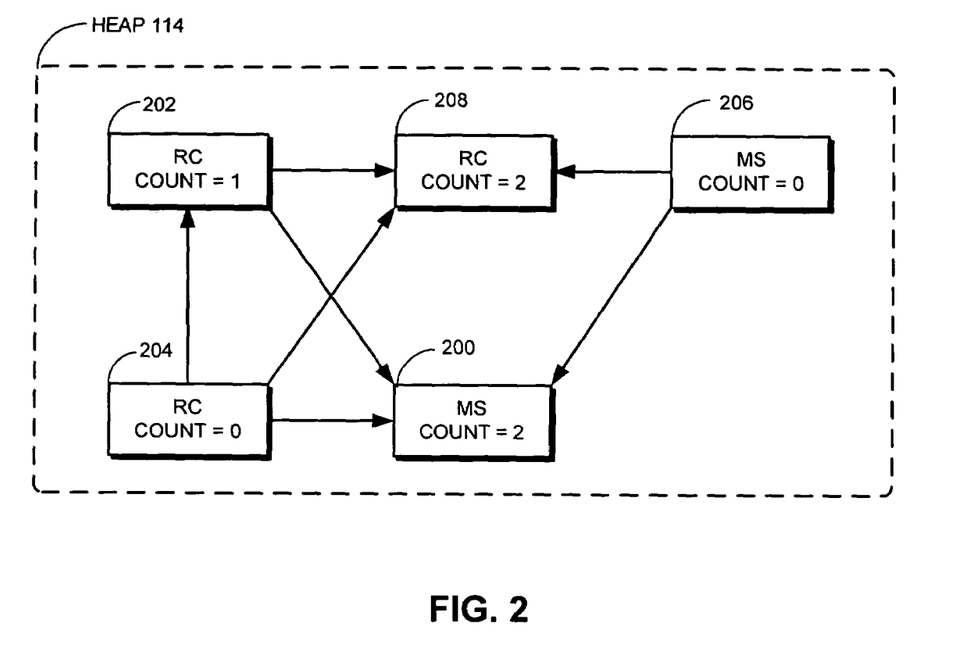
FIG. 2 illustrates how to compute a reference count for an object in accordance with an embodiment of the present invention.

FIG. 2 illustrates how to compute a reference count for an object in accordance with an embodiment of the present invention. For example, MS object 200 has a reference count of 2 because it is referred to by references from two RC objects 202 and 204. Note that the reference from MS object 206 is not counted in object 200's reference count. RC object 208 has a reference count of 2 because it also is referred to by references from two RC objects 202 and 204. However, the reference from MS object 206 is not counted.

Note that, during the execution of the application, an object can be converted from an MS object to an RC object, or from an RC object to an MS object. A general rule for converting one type of object into the other type is to determine whether or not an object continues to have the property under which it was initially classified. In one embodiment of the present invention, if an RC object is modified by a mutator the first time after the object is classified as an RC object, this RC object can be converted into an MS object. Conversely, an object which is classified as an MS object can be converted to an RC object if the object has not been modified for a specific number of GC cycles. Whether such conversions will facilitate reducing GC operation overhead depends on the relative rates of mutation of the objects and GC cycles.

To convert an MS object into an RC object, one needs to change the indicator bit of the object to indicate that the object is an RC object and then increment reference counts for all referents of the object. On the other hand, to convert an RC object into an MS object, one needs to change the indicator bit of the object to indicate that the object is an MS object and then decrement reference counts for all referents of the object.

Improved Mark-Sweep Garbage Collection

Figure 3:
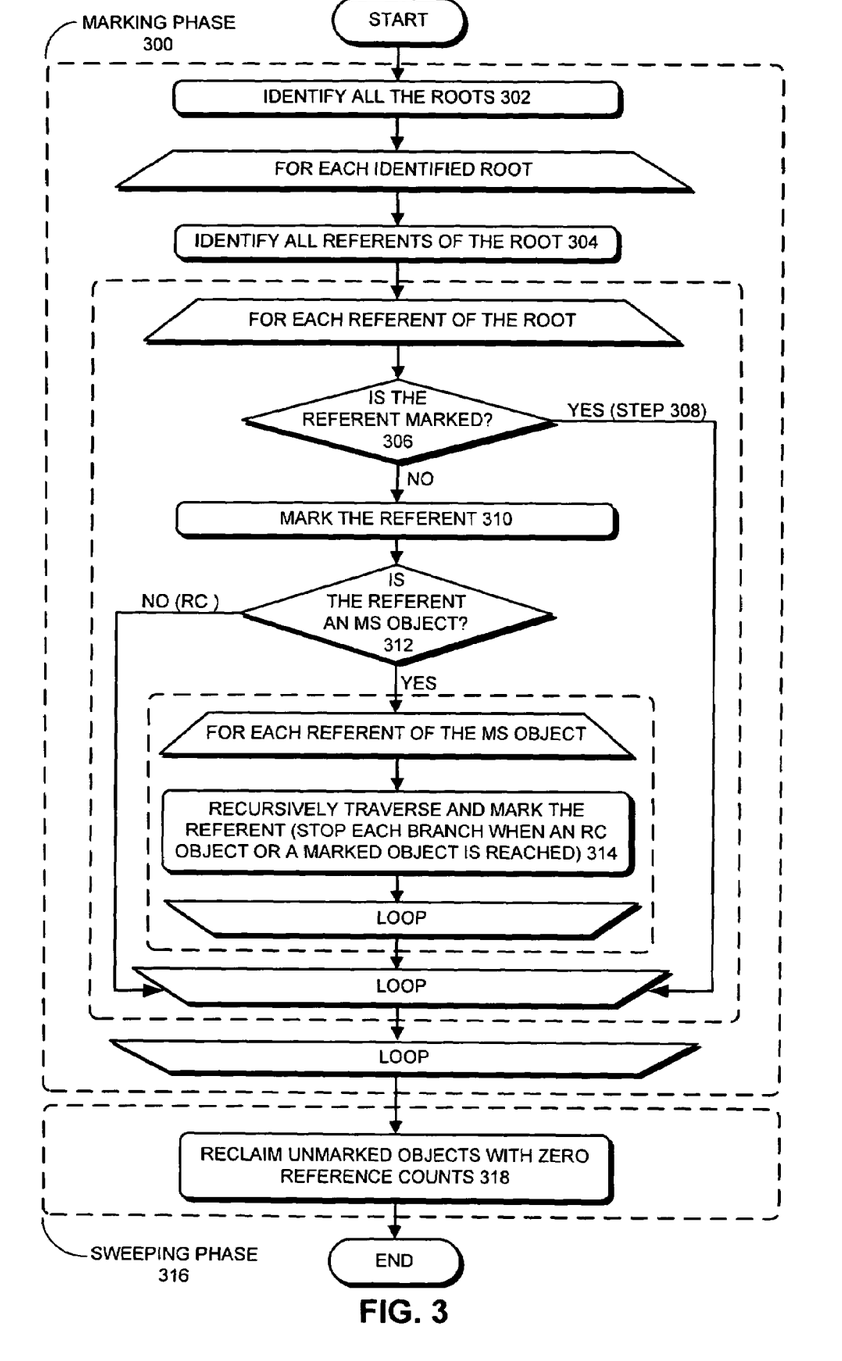
FIG. 3 presents a flowchart illustrating the process of performing an improved MS GC operation in accordance with an embodiment of the present invention.

FIG. 3 presents a flowchart illustrating the process of performing an improved MS GC operation in accordance with an embodiment of the present invention. A GC cycle for the present invention involves a marking phase followed by a sweeping phase, which is similar to a regular MS GC operation. However, because the system supports both MS and RC objects, the two types of objects are handled differently in the improved MS GC operation. Furthermore, the improved MS GC operation performs reference-counting operations prior to the sweeping phase, wherein the reference-counting operations take place primarily in the RC objects' portion of the memory.

The improved GC operation begins with a marking phase 300. The marking phase 300 starts by identifying all the roots for marking phase 300 (step 302). The roots for the marking phase are found in the same manner as a regular MS GC operation. For example, the roots can be found in the registers, in the stack, and in the global variables. In addition to the above types of roots, MS objects with non-zero reference counts also serve as roots for the marking phase. A more detailed explanation of this additional type of root will be provided below.

Next, for each of the roots, the operation identifies all the referents of the root (step 304).

For each of the referents identified in step 304, the operation next determines whether the referent object is already marked (step 306). If so, the operation does not examine the referent object further and moves on to the next referent of the root (step 308).

On the other hand, if the referent of the root is not marked, the operation then marks the referent by setting the mark bit of the referent (step 310) and subsequently determines whether the referent is an MS object or an RC object by examining the indicator bit of the referent (step 312). If the referent is an MS object, the marking operation then recursively traverses and marks each referent of the MS object (step 314). Specifically, the recursive traversal and marking of the referents of the MS object stops for a branch when an RC object is encountered. Additionally, marking will also stop for a branch when attempting to mark an already-marked object (either an MS object or an RC object). However, if an unmarked RC object referent is reached, the referent is also marked but not examined further.

After marking phase 300 is complete, sweeping may commence. Unmarked objects with zero reference counts may be reclaimed (step 318). When an RC object is reclaimed, the reference counts of its referents should be decremented.

Exemplary Marking Phase

Figure 4:
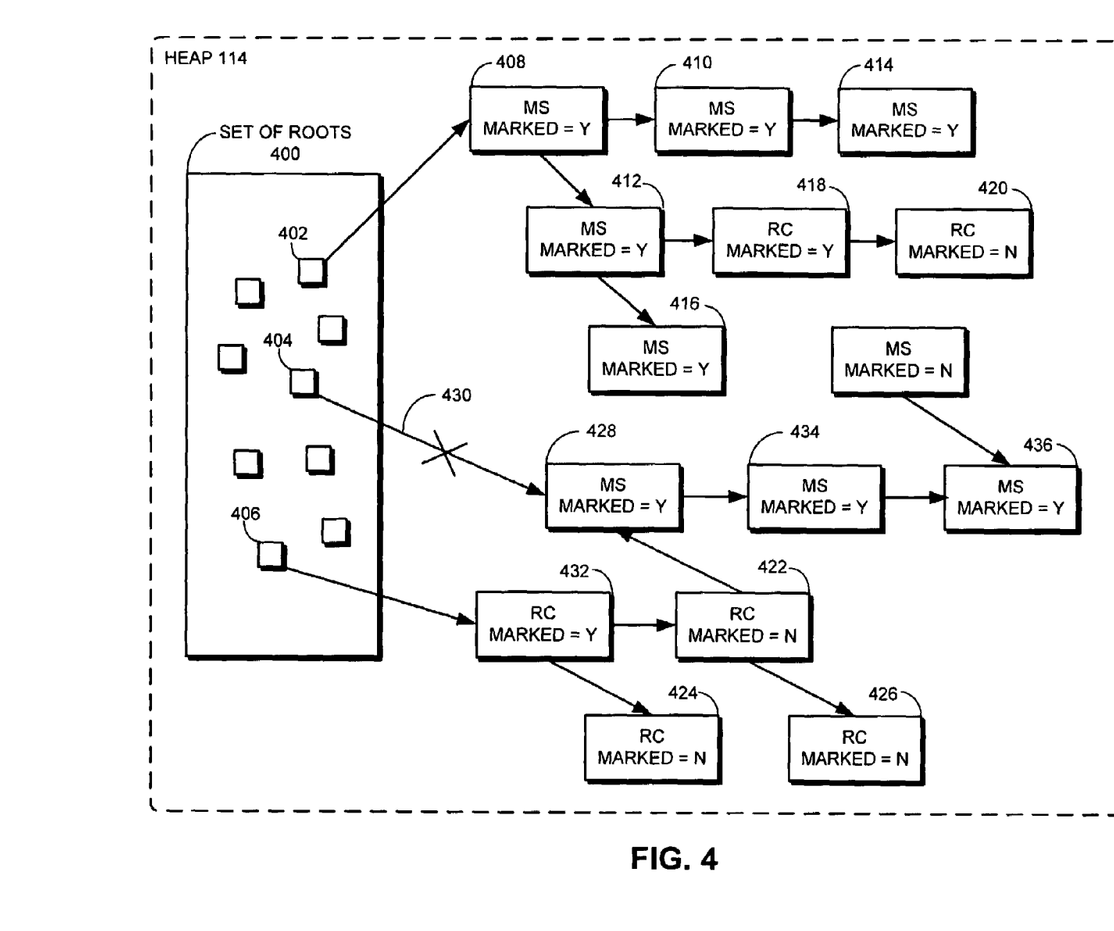
FIG. 4 illustrates an exemplary marking phase of the improved MS GC operation in accordance with an embodiment of the present invention.

FIG. 4 illustrates an exemplary marking phase of the improved MS GC operation in accordance with an embodiment of the present invention. The process starts by identifying a set of roots 400, which includes roots 402, 404 and 406. From root 402, the process marks a referent 408. Because object 408 is an MS object, the process then continues to mark referents 410 and 412 of object 408. Since both objects 410 and 412 are MS objects, the process recursively traverses these objects and marks objects 414, 416, and 418. However, when RC object 418 is marked, its contents are not examined further. As a result, RC object 420 is left unmarked. The process also recursively traverses and marks all of the objects from roots 404 and 406 accordingly.

Note that the improved MS GC operation avoids performing any traversal through the RC objects. Consequently, an RC object that is not reached during the marking phase will be unmarked, such as RC objects 420, 422, 424, and 426. If the RC objects are located within a slowly-changing majority of the memory, for example a large read-mostly database, then the present invention can significantly reduce work involved in the marking phase in comparison to a regular MS GC technique, which has to traverse all reachable objects.

Note that, because the majority of the RC objects will likely be unmarked during the marking phase 300, it is important for an RC object to maintain an up-to-date reference count in its referents' reference counters. In one embodiment of the present invention that provides such a guarantee, an RC object obeys the invariant that the references it contains are all accounted for in the reference counter fields of their associated referents. This in turn requires mutators modifying the RC objects to maintain such reference counts.

Specifically, during mutation operations, whenever a mutator modifies a reference within an object to point to a new referent, the mutator checks whether this object is an RC object or an MS object. If it is an RC object, the mutator decrements the reference count in the referent which is being unreferenced and increments the reference count in the referent which is newly referenced. This operation may be performed efficiently in hardware, for example, by the translator in an object-addressed memory hierarchy when a cache line containing part of the modified object is written back to main memory (see G. M. Wright, M. L. Seidl and M. I. Wolczko, "An Object-Aware Memory Architecture," Sun Microsystems Laboratories Technical Report SML-TR-2005-143, February 2005).

Note that, even though in the present invention the mutators are responsible for updating the reference counts of the objects, specifically when the RC objects are being modified, it should be apparent that the present technique is much more efficient than a regular RC GC operation. This is because the RC objects typically comprise an infrequently modified portion of the heap and therefore do not require frequent reference-count updates. Marking the more frequently modified objects in the memory (MS objects) is done in the marking phase of the improved MC GC operation, which does not involve reference counter manipulations.

When marking phase 300 is completed, all live objects will either be marked or will have a non-zero reference count. Hence, during a subsequent sweeping phase 316 of the improved MS GC operation, all objects which are unmarked and have a zero reference count may be reclaimed (step 318). Note that an RC object whose reference count reaches zero may not be collected immediately. Rather, the collection process takes place during the sweeping phase for all objects in the heap. At that time, when an RC object is reclaimed, the reference counts of all of its referents are decremented, which may lead to the detection of additional garbage objects.

As mentioned previously, the marking phase needs to include MS objects that have a non-zero reference count in addition to the traditional roots. This is explained further using the example of FIG. 4.

As illustrated in FIG. 4, object 428 is an MS object which is a referent of root 404. Also note that MS object 428 has a reference count of "1" because it is referred to by an RC object reference 422 through reference link 430. When reference link 430 is removed, object 428 is no longer reachable from root 404 directly during the marking phase of the next GC cycle. Furthermore, note that during a regular MS GC operation, object 428 would have been still reachable from root 406 through RC objects 432 and 422, and therefore MS objects 428, 434, and 436 would have been marked accordingly. However, if the roots for the marking phase are restricted to the set of roots 400 during the improved MS GC operation, the marking phase will not traverse RC object 432, thereby leaving MS objects 428, 434, and 436 unreachable, and hence unmarked. Note that MS objects 434 and 436 also have reference counts of zero. Consequently, MS objects 434 and 436 will be reclaimed during the corresponding sweeping phase. In order to avoid such an error, the improved MS GC operation also regards MS object 428 as a root and in doing so, objects 434 and 436 will still be marked when the reference 430 has been removed.

Note, since MS object 428 is not reachable from the set of roots 400, it has to be identified in some other way. In one embodiment of the present invention, MS objects with non-zero reference counts may be found through an object table. A more-detailed description of the object table for locating the type of root like object 428 can be found in U.S. patent application Ser. No. 10/903,169, entitled, "Method and Apparatus for Maintaining an Object-Based Write Barrier to Facilitate Garbage-Collection Operations," by inventors G. M. Wright, M. L. Seidl and M. I. Wolczko.

Like other reference-counting GC techniques, the improved MS GC operation does not collect cyclic data structure garbage which is contained in the reference-counted portion of the memory. This type of garbage may be reclaimed using conventional cyclic garbage detection techniques, or by periodically running a regular mark-sweep GC over the entire memory space.

Note that in the improved MS GC operation, the liveness of an object is not only determined by the reference count but also by the mark bits. For example, in FIG. 4, both RC object 418 and MS object 416 have zero reference counts even though they are referred to by MS object 412. However, objects 416 and 418 will be safe from reclamation during garbage collection because both of them can be marked. Not incrementing the reference counters in such cases can reduce the GC overhead and pause time.

In conclusion, the improved MS GC process, in comparison to a regular MS GC, requires less work during each GC cycle because only a portion of the heap needs to be recursively traversed and marked from one cycle to the next. On the other hand, in comparison to a regular RC GC process, the improved MS GC process requires less overhead for frequently-modified objects.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating garbage collection (GC) in a memory-management system that supports both mark-sweep (MS) objects and reference-counted (RC) objects, wherein both MS objects and RC objects can be marked and have a reference count, the method comprising:
   during a marking phase of a GC operation in a memory-management system,
      identifying roots for the GC operation,
      marking referents of the roots, and
      recursively traversing referents of the roots which are MS objects and while doing so, marking referents of the traversed MS objects, wherein while recursively traversing referents of the roots which are MS objects, when a referent is identified as an RC object, the referent is marked but is not recursively traversed; and
   during a subsequent sweeping phase of the GC operation, reclaiming objects that are unmarked and have a zero reference count, wherein marked RC objects are not reclaimed,
   wherein objects which are frequently modified are classified as MS objects; and
   wherein objects which are infrequently modified are classified as RC objects.

2. The method of claim 1, wherein both MS objects and RC objects contain:
   an indicator bit indicating whether the object is an MS object or an RC object;
   a mark bit indicating whether the object is marked or unmarked; and
   a reference counter, which maintains a reference count for the object.

3. The method of claim 1, wherein identifying roots for the GC operation involves identifying MS objects with non-zero reference counts.

4. The method of claim 1, wherein while recursively traversing referents of the roots, if a referent is identified as an RC object, the referent is marked but is not recursively traversed.

5. The method of claim 2:
   wherein an RC object, which contains a reference to a referent, which is either an MS object or and RC object, contributes one to the referent's reference count; and
   wherein an MS object which contains a reference to a referent, which is either an MS object or an RC object, does not contribute to the referent's reference count.

6. The method of claim 1, further comprising:
   receiving a command to modify a reference within an object to point to a new referent; and
   if the object is an RC object, decrementing the reference count in a previous referent for the reference and incrementing the reference count in the new referent for the reference.

7. The method of claim 2, wherein an object can be converted from an MS object to an RC object by:
   changing the indicator bit of the object to indicate that the object is an RC object; and
   incrementing reference counts for all referents of the object.

8. The method of claim 2, wherein an object can be converted from an RC object to an MS object by:
   changing the indicator bit of the object to indicate that the object is an MS object; and
   decrementing reference counts for all referents of the object.

9. A computer-readable storage medium storing instructions that when executed by a computer cause the computer to perform a method for facilitating garbage collection (GC) in a memory-management system that supports both mark-sweep (MS) objects and reference-counted (RC) objects, wherein both MS objects and RC objects can be marked and have a reference count, the method comprising:
   during a marking phase of a GC operation,
      identifying roots for the GC operation,
      marking referents of the roots, and
      recursively traversing referents of the roots which are MS objects and while doing so, marking referents of the traversed MS objects, wherein while recursively traversing referents of the roots which are MS objects, when a referent is identified as an RC object, the referent is marked but is not recursively traversed; and
   during a subsequent sweeping phase of the GC operation, reclaiming objects that are unmarked and have a zero reference count, wherein marked RC objects are not reclaimed,
   wherein objects which are frequently modified are classified as MS objects; and
   wherein objects which are infrequently modified are classified as RC objects.

10. The computer-readable storage medium of claim 9, wherein both MS objects and RC objects contain:
    an indicator bit indicating whether the object is an MS object or an RC object;
    a mark bit indicating whether the object is marked or unmarked; and
    a reference counter, which maintains a reference count for the object.

11. The computer-readable storage medium of claim 9, wherein identifying roots for the GC operation involves identifying MS objects with non-zero reference counts.

12. The computer-readable storage medium of claim 9, wherein while recursively traversing referents of the roots, if a referent is identified as an RC object, the referent is marked but is not recursively traversed.

13. The computer-readable storage medium of claim 10,
    wherein an RC object, which contains a reference to a referent, which is either an MS object or and RC object, contributes one to the referent's reference count; and wherein an MS object which contains a reference to a referent, which is either an MS object or an RC object, does not contribute to the referent's reference count.

14. The computer-readable storage medium of claim 9, further comprising:

receiving a command to modify a reference within an object to point to a new referent; and if the object is an RC object, decrementing the reference count in a previous referent for the reference and incrementing the reference count in the new referent for the reference.

15. The computer-readable storage medium of claim 10, wherein an object can be converted from an MS object to an RC object by:

changing the indicator bit of the object to indicate that the object is an RC object; and incrementing reference counts for all referents of the object.

16. The computer-readable storage medium of claim 10, wherein an object can be converted from an RC object to an MS object by:

changing the indicator bit of the object to indicate that the object is an MS object; and decrementing reference counts for all referents of the object.

17. A computer system that facilitates garbage collection (GC) in a memory-management system that supports both mark-sweep (MS) objects and reference-counted (RC) objects, wherein both MS objects and RC objects can be marked and have a reference count, the apparatus comprising:

a processor;

a memory;

an identification mechanism implemented in the computer system and configured to identify roots for a GC operation during a marking phase of the GC operation;

a marking mechanism implemented in the computer system and configured to mark referents of the roots during the marking phase of the GC operation;

a traversing mechanism implemented in the computer system and configured to recursively traverse referents of the roots which are MS objects during the marking phase of the GC operation and while doing so, marking referents of the traversed MS objects, wherein while recursively traversing referents of the roots which are MS objects, when a referent is identified as an RC object, the referent is marked but is not recursively traversed; and a reclamation mechanism implemented in the computer system and configured to reclaim objects that are unmarked and have a zero reference count during a subsequent sweeping phase of the GC operation, wherein marked RC objects are not reclaimed, wherein objects which are frequently modified are classified as MS objects; and wherein objects which are infrequently modified are classified as RC objects.

18. The computer system of claim 17, wherein both MS objects and RC objects contain:

an indicator bit indicating whether the object is an MS object or an RC object;

a mark bit indicating whether the object is marked or unmarked; and a reference counter, which maintains a reference count for the object.

* * * * *

UNITED STATES PATENT AND TRADEMARK OFFICE
CERTIFICATE OF CORRECTION

PATENT NO. : 7,631,024 B2  
APPLICATION NO. : 11/325381  
DATED : December 8, 2009  
INVENTOR(S) : Wright et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 375 days.

Signed and Sealed this

Second Day of November, 2010

David J. Kappos  
*Director of the United States Patent and Trademark Office*